Patented Mar. 10, 1931

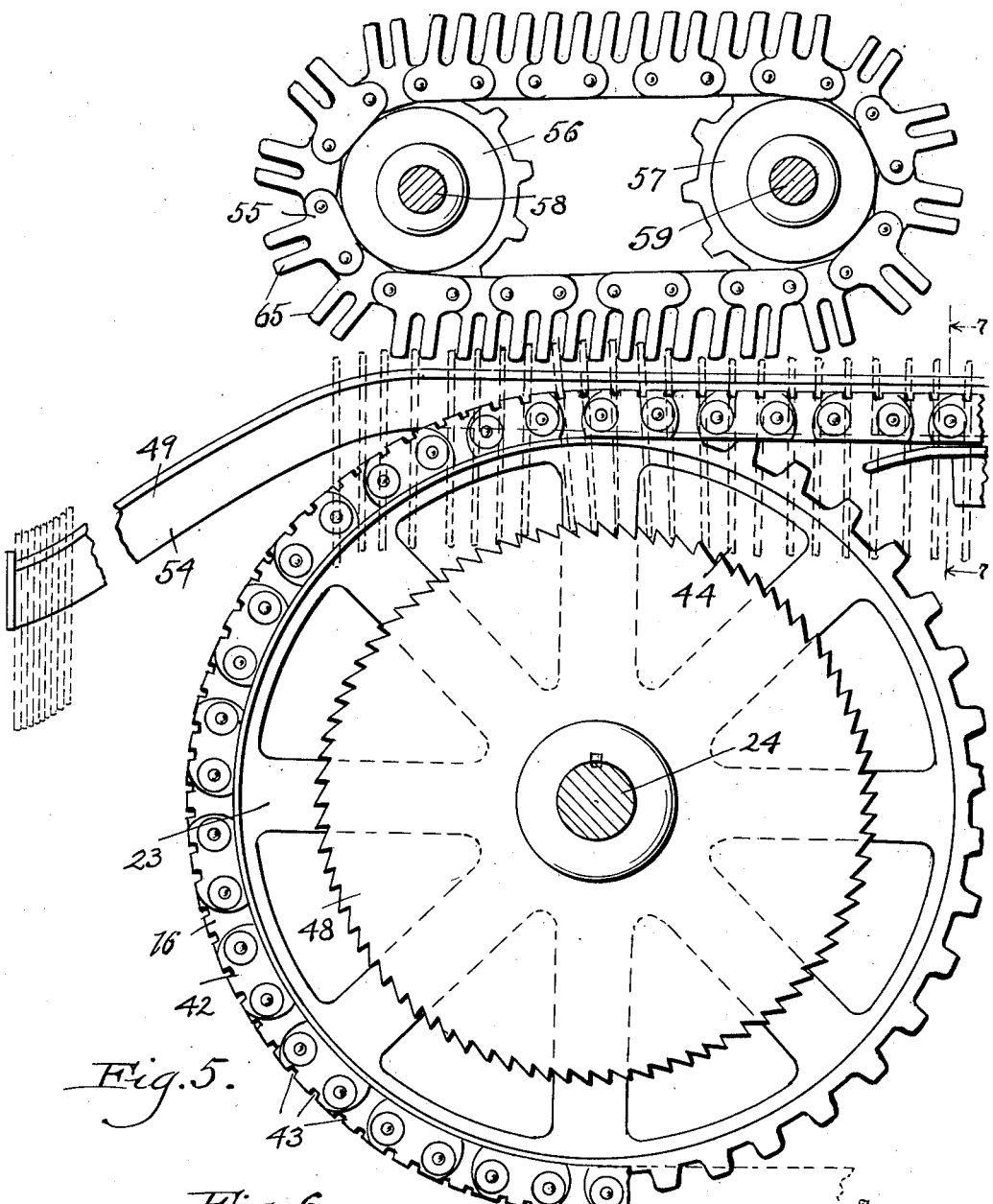

1,795,612

UNITED STATES PATENT OFFICE

HENRY W. LORMOR, OF CLEVELAND HEIGHTS, OHIO, ASSIGNOR TO WILLARD STORAGE BATTERY COMPANY, OF CLEVELAND, OHIO, A CORPORATION OF WEST VIRGINIA

APPARATUS FOR HANDLING STORAGE-BATTERY PLATES

Application filed August 12, 1927. Serial No. 212,413.

This invention relates to an apparatus for drying storage battery grids which have been filled with paste or active material and has for its object to provide an automatically operated apparatus which is simple in construction and considerably more efficient in operation than apparatus now generally employed for this purpose.

It is customary to construct grids for storage battery use in what is commonly known or termed as pairs, which are joined together along one edge and each grid of the pair is provided with a laterally extending lug, one of which is longer than the other. The grids in pairs are fed through a paste or active material machine and the pasting material is securely pressed into the interstices of the grids to form a homogenous mask which is maintained within the grids by a plurality of projections. Ordinarily these grids are supported in receptacles and placed within a heating vat where the paste or active material is thoroughly dried. The grids are then later cut or separated along their joining edges and thus form the plates of the storage battery. The drying process as heretofore carried out has been rather slow and it is, therefore, a principal object of the present invention to produce an apparatus which will more efficiently dry the storage battery plates.

The primary object of the invention is to provide an automatically operated apparatus in which the grids containing the wet paste or active material are thoroughly dried by advancing the plates while suspended from the laterally extending lugs through a drying chamber against a flow of air either heated or cooled, which is flowing in a direction in opposition to the traveling plates.

A further object of the invention is to provide a mechanism whereby when the plates have passed through the drying chamber and the paste or active material thoroughly dried, the former are automatically removed from the conveying means.

A still further object of the invention is to provide means whereby when the plates have been removed from the conveying means they are advanced to a position beyond the apparatus and subsequently stacked in a convenient manner so that they may be readily and easily removed.

Due to the effect of the acid in the pasting or active material of the plates upon the conveyor, it is an object to provide means whereby the conveyor is required to pass through an alkali bath upon its return to a position in which new plates are placed upon the conveyor which cleanses the same. This prevents the possibility of an accumulation of corrosion upon the conveyor which would, if permitted to accumulate, result in injury to the apparatus and very likely render the same inefficient.

Another object is to control the rate of travel of the plates through the drying chamber and to further regulate the flow of air in opposition to the plates, these factors being dependent upon the amount of moisture contained in the paste or active material used in filling the plates.

With the above objects indicated and other objects hereinafter explained in view, my invention consists in the apparatus hereinafter described and claimed.

Referring to the drawings:

Fig. 5 is an enlarged fragmentary view of the means for disengaging the plates or grids from the conveyor and the manner in which they are stacked;

Fig. 6 is a fragmentary top plan view of the angle upon which the plates slide, showing the manner in which they are cut to receive the plates; and Fig. 7 is a fragmentary view showing the manner of supporting the twin plates by their lugs.

Figure 1:
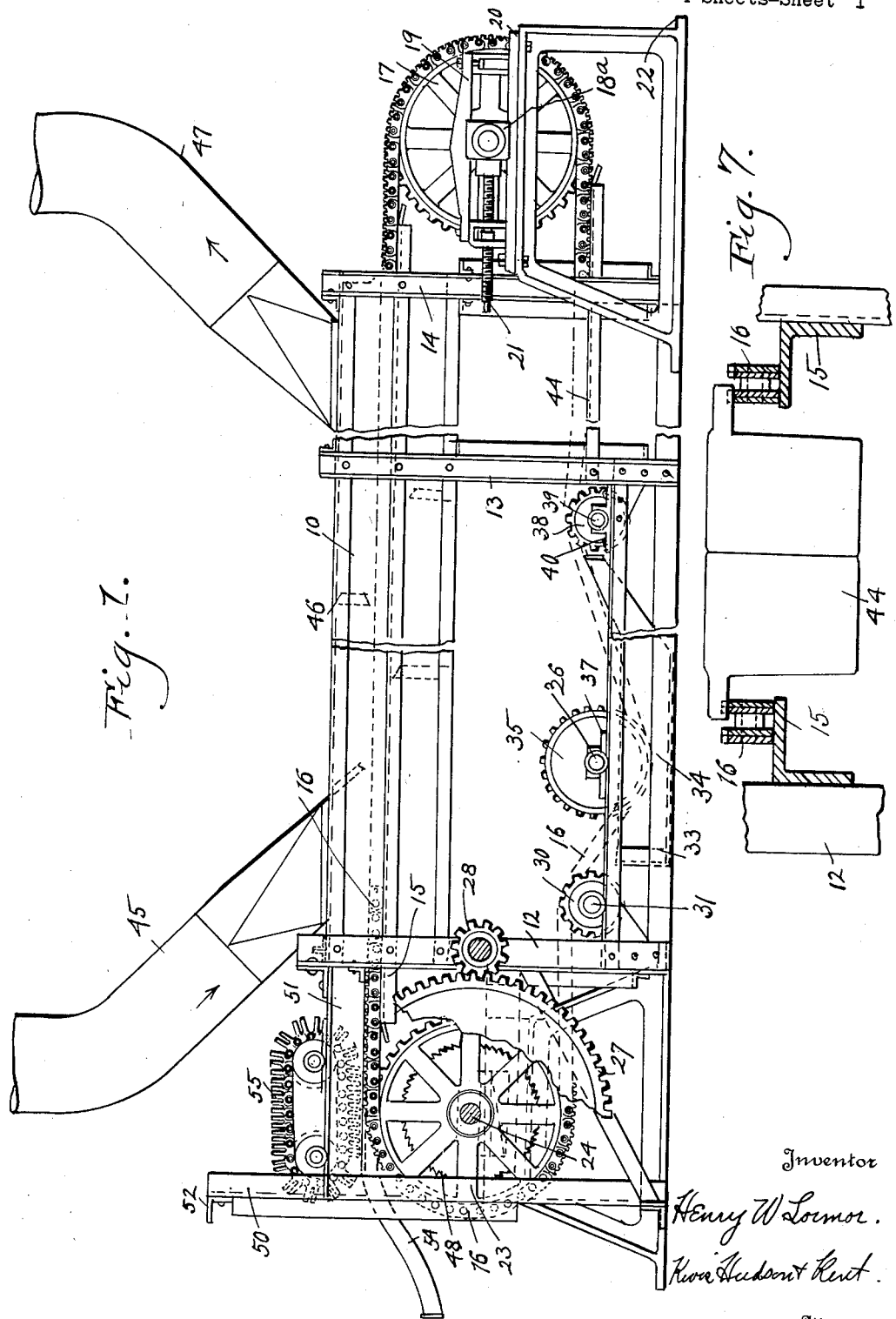
Fig. 1 is a side elevational view of the machine or apparatus embodying my invention.
Figure 2:
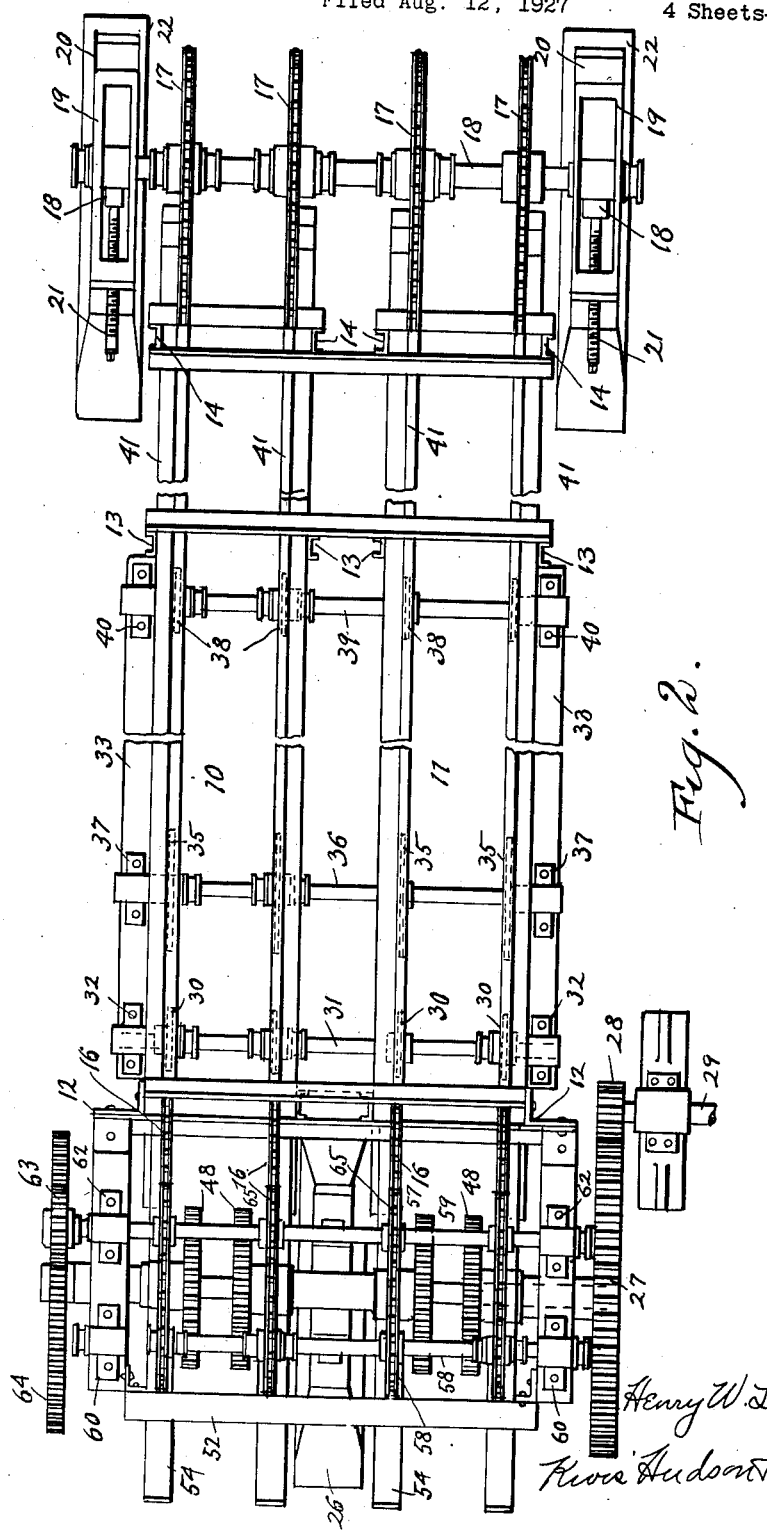
Fig. 2 is a top plan view of the same.
Figure 3:
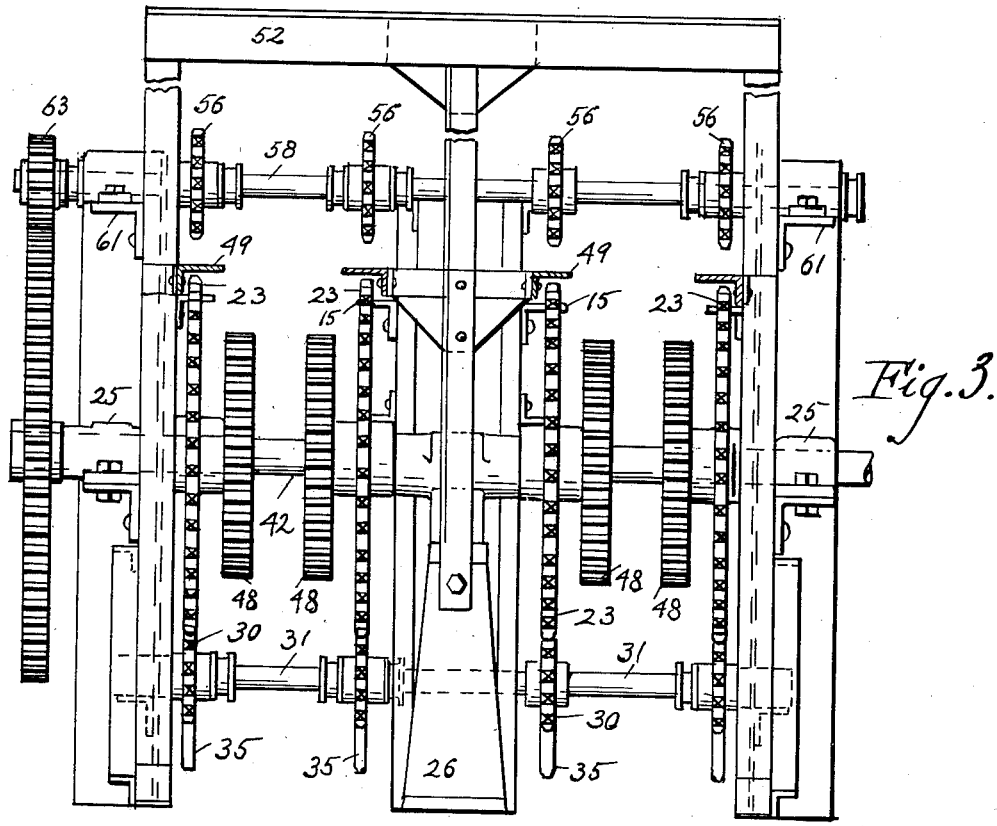
Fig. 3 is an end view looking inwardly from the discharge end of the apparatus.
Figure 4:
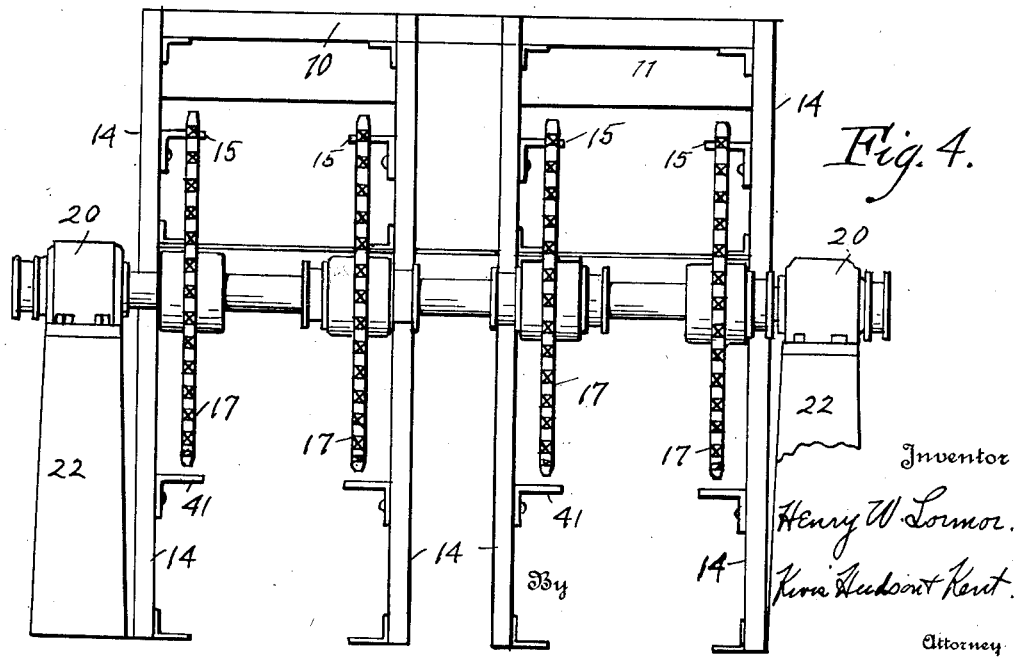
Fig. 4 is an end elevational view looking inwardly from the opposite end shown in Fig. 3, or the feeding end of the apparatus.

In the drawings 10 and 11 indicate respectively a pair of longitudinally parallel extending chambers or compartments of suitable length which are made of sheet metal and provided with proper angle reinforced corners to form suitable passageways for the plates. These chambers or compartments are supported in horizontal position by a plurality of properly spaced uprights, three of which are here shown and indicated 12, 13 and 14, which uprights are suitably supported by a floor or other foundation. The uprights are made in the usual manner with channels and suitably braced and cross-braced so as to provide a rigid structure capable of supporting in horizontally parallel spaced relation the two compartments 10 and 11 as here shown. Any number of these compartments may be employed depending upon the number of plates it is desired to treat. However, from actual practice it has been found that the machine can be more efficiently operated when the plates or grids are dried in pairs, and, furthermore, that they can be more thoroughly dried when two rows of plates are advanced through independent chambers or compartments as shown at 10 and 11.

A pair of angles 15 is suitably secured to the inner side walls of the compartments 10 and 11 and these angles extend for a short distance beyond the open ends of the compartments. These angles have their upper legs disposed in a horizontal plane and are adapted to support the upper portion of the conveyor chains 16.

At the front or feed end of the apparatus, the conveyor chains 16 are carried by toothed wheels 17 freely mounted upon a transverse shaft 18, the outer ends of which are journaled in slidable blocks 18a. These blocks are mounted between longitudinally extending guides 19 and 20 and can be moved longitudinally so as to adjust the tension of the chains by a screw 21. The lower guides 20 are secured in any suitable manner to standards 22 which are disposed on the extreme opposite sides of the apparatus. As shown upon the drawings, these standards are supported by the floor which supports the uprights 12, 13 and 14, but any arrangement may be employed whereby the chains 16 are supported in proper relation to the compartments 10 and 11 through which the plates or grids are fed during the drying operation.

The chains 16 are carried at the opposite ends or the discharge ends by toothed wheels 23, one for each chain, and the wheels 23 are rigidly mounted upon the rotatable transverse shaft 24 which has its ends journaled in suitable bearings 25, the latter being secured upon a pair of standards 26 suitably supported and disposed beyond the side of the apparatus.

One end of the shaft 24 has securely mounted thereon beyond the standard 26, a gear 27 which meshes with a pinion 28 fixed to the end of a shaft 29 communicating with a source of power such as a motor. In this manner the toothed wheels 23 are rotated and cause the conveyor chains 16, carrying the plates or grids, to be advanced through the compartments 10 and 11.

Because of the effect of the acid from the plates upon the conveyor chains 16, it is desirable to have the chains pass through an alkali bath on their return after having discharged the plates, to remove the acid and prevent corrosion of the chains. In the present instance, as indicated in Fig. 1, the chains 16 pass over toothed idler wheels 30 which are rotatably mounted upon a transverse shaft 31. The ends of this shaft are journaled in suitable bearings 32 secured to longitudinally extending angle supporting members 33 which are supported at their ends by the lower portions of the uprights 12 and 13. Disposed between these side members 33 and directly below the conveyor chains 16 is a tank 34 adapted to hold an alkali solution, and to insure that the chains 16 pass through this bath, the chains extend under a plurality of toothed wheels 35, the same being rotatably mounted upon a transverse shaft 36 which has its ends journaled in suitable bearings 37 secured and supported by the side members 33. These toothed wheels 35 are suitably positioned so that they extend downwardly into the solution maintained in the tank 34 and the conveyor chains 16 in passing under the wheels 35 are required to pass through the solution which counteracts the action of the acid upon the chains 16. The chains then extend upwardly over other toothed idler wheels 38 positioned on the opposite side of the wheels 35 to that on which the wheels 30 are positioned, and the former is rotatably mounted upon a transverse shaft 39, the ends of which are mounted in suitable bearings 40 supported by the side members 33. Between the wheels 38 and the wheels 17 the chains are guided in their movement by longitudinally extending angles 41 secured to the uprights 13 and 14 and suitably positioned so that the chains are adapted to engage and be supported by the angles 41.

Referring particularly to Fig. 5, it will be noted that the conveyor chains 16 are made up of a plurality of pivoted links 42 which have their outer surfaces provided with a plurality of laterally extending grooves 43 of sufficient width and depth to conveniently receive the extensions or lugs provided on each twin plate and each pair of conveyor chains 6 is spaced apart a suitable distance so that the plates will be freely suspended therebetween. The plates in this instance are indicated by 44 and it should be here understood that each plate is fed to the conveyor chains 16 singly and by hand, although other means may be employed if desired. The plates 44 are, of course, conveyed through one or the other of the compartments 10 or 11 and against these moving plates is directed a flow of air either heated or otherwise. As shown in Fig. 1, an inlet pipe 45 is disposed over a suitable opening provided adjacent the discharge end of the chambers which is connected to a source of air and the usual fan for forcing the air through the chambers in a direction opposite to the travel of the plates. At suitable intervals within the chambers a series of baffles 46 are secured so as to direct the flow of air in the most efficient manner against the plates 44. At the end opposite the discharge end of the compartments is a second pipe 47 through which the air within the chambers may be drawn off in any suitable manner.

As so far described, the apparatus has related to the manner in which the plates are fed to the conveyor chains and advanced through the compartments 10 and 11 against the flow of air either heated or otherwise, and when discharged from the end of the compartments the speed of the plates has been so regulated that the moist paste or active material of the plates has become thoroughly dried. However, it would be very slow and inefficient if these plates were to be removed from the conveyor chains 16 by hand. I therefore provide for the automatic removing of the plates from the conveyor chains 16 and further provide a means for automatically stacking these plates which will now be described in detail.

Referring particularly to Fig. 5, the conveyor chains 16 are here shown extending around the toothed wheels 23 and a plurality of plates or grids 44 are suspended by the chains. A pair of toothed disks 48 is keyed or otherwise secured to the transverse shaft 24 and positioned directly beneath the plates or grids 44. The diameter of the disks is such that the teeth extend slightly above the lowest portion of the suspended plates or grids. Furthermore, the teeth extend laterally and are positioned with respect to the grooves 43 of the conveyor chains 16 so that each tooth of the disks is adapted to engage and lift slightly upwardly the plate or grid suspended in the associated groove 43. As the plates are moved upwardly, the extensions or lugs thereupon are disengaged from the grooves 43 and moved into engagement with a pair of horizontally extending guide rails 49 secured to the uprights 12 and 50 respectively, which uprights are suitably connected to the uprights 12 by cross members 51 and spaced a suitable distance apart by horizontally transversely disposed members 52 or otherwise suitably supported to provide a rigid structure. The top surfaces of the guide rails are cut as indicated by 53 in Fig. 6, to permit the lugs or extensions of the plates to avoid the rails at the point where they are disengaged from the conveyor chains 16 but are adapted to receive and support the lugs or extensions of the plates as they are moved ahead.

Of course, when the plates have been disengaged from the conveyor chains 16 it is essential to effect the further advancing of the plates aside from the rotation of the disks 48 so a second conveyor is positioned directly above the plates or grids and is adapted to engage the plates or grids at the moment they are disengaged from the conveyor chains 16 and to continue to move the plates along the guide rails 49. The forward ends of the guide rails 49 are curved downwardly to form a slide 54 and as the plates are advanced to the top of the slide 54 the plates will by gravity move down the slide and become automatically stacked.

The second conveyor is composed of link chains 55 carried by toothed wheels 56 and 57 positioned directly above the wheels 23 and keyed or otherwise secured to transversely extending shafts 58 and 59. The ends of the shaft 58 are journaled in suitable bearings 60 supported upon suitably positioned longitudinally extending angles 61 secured at the upper portion between the uprights 12 and 50. The ends of the shaft 59 are journaled in suitable bearings 62 also supported by the members 61, and to advance the second conveyor at the same rate of speed as the conveyor chains 16, a pinion 63 is fixed to the end of the shaft 59 and meshes with the gear 64 fixed to the main shaft 24 on the side opposite the gear 27.

Each link of the link chain 55 of the second conveyor, as clearly shown in Fig. 5, is provided with a pair of fingers 65 which are spaced apart so as to receive therebetween one plate or grid and extend downwardly a sufficient distance to amply engage the plates or grids and move them along the guide rails 49.

From the foregoing description it is believed that the operation of the apparatus will be readily understood so that only a brief description will be here necessary.

As before stated, the plates are fed preferably by hand onto the conveyor chains 16 and suspended by the extensions or lugs of the plates in the grooves 43 and advanced by the conveyor chains 16 through one or the other of the compartments 10 or 11, depending upon which set of chains the plates are suspended from.

While passing through these compartments, a flow of air is established which flows in a direction opposite to that in which the plates are traveling. The movement of the plates is regulated in proportion to the rate of flow of the air so that the moisture in the paste or active material of the plates is thoroughly removed by the time the plates are discharged from the end of the compartments.

As the plates are discharged from the compartments, the lower edge of the suspended plates engage the teeth of the disks 48 and are raised upwardly a sufficient distance so that the lugs or extensions on the plates are disengaged from the grooves 43 past the cut edge 53 of the guide rails 49 until the lugs or extensions rest upon the upper surface of the guide rails 49 beyond the cut edge 53. At just this point the plates have been raised sufficiently so that they are disposed between a pair of fingers 65 on the second conveyor 55, and as the latter and disks 48 are geared so as to move together at the same rate of speed, the plates are advanced further along the guide rails until they are supported only by the guide rails. Each plate leaves the conveyor 55 at the point where the guide rails form a slide and each passes down the slide and becomes stacked at the lower end where they can be easily and readily removed to any desired location.

While I have described the preferred apparatus embodying my present invention, it is to be understood that I am not to be limited thereto inasmuch as changes and modifications may be made in the structure without departing from the spirit of the invention as defined in the appended claims.

Having thus described my invention, I claim:

1. In combination, a pair of conveyor members spaced apart and adapted to support therebetween plates in vertical spaced relation, means adapted to engage each plate for removing the latter from said conveyor members, a second conveyor positioned adjacent said conveyor members and adapted to engage each plate as the latter are removed from said conveyor members to advance said plates independently of said conveyor members.

2. In combination, a pair of conveyor members spaced apart and adapted to support therebetween plates in vertical spaced relation, means adapted to engage each plate for removing the latter from said conveyor members, a second conveyor positioned adjacent said conveyor members and operating in timed relation thereto, said second conveyor being adapted to engage each plate as the latter are removed from said conveyor members to advance said plates independently of said conveyor members.

3. In combination, a conveyor for supporting plates in vertical spaced relation, means adapted to engage said plates to remove the latter from said conveyor, a second conveyor adjacent said first conveyor adapted to engage said plates to advance the plates independently of said first conveyor as they are removed from the latter and operated in timed relation said first conveyor, and means for automatically stacking said plates.

4. In combination, means for conveying plates, a movable member adapted to engage the plates to remove the latter from the conveying means, and a conveyor disposed above the conveying means with which the removed plates cooperate and are thereby moved independently of the conveying means.

5. In combination, means for conveying plates, a movable member adapted to engage the plates to remove the latter from the conveying means, and a conveyor provided with a plurality of spaced fingers with which the removed plates are adapted to cooperate to thereby move the plates independently of the conveying means.

6. In combination, means for conveying plates, rails positioned adjacent one end of the conveying means, a member adapted to engage the plates to transfer the latter from the conveying means to said rails, and means for engaging the plates to move the latter along said rails.

7. In combination, means for conveying plates, a pair of rails positioned adjacent one end of the conveying means and having declining end portions, means adapted to engage said plates to remove the latter from said conveying means and onto said rails, and means engageable with said plates to move the latter along said rails toward the declining end portion.

8. In combination, means for conveying plates, rails positioned adjacent one end of the conveying means, and means for engaging the plates to transfer the latter from the conveying means to said rails.

9. In combination, means for conveying plates, rails positioned at one end of the conveying means, and means for engaging said plates successively to transfer the latter from the conveying means to said rails.

10. In a conveying and discharge mechanism for storage battery plates having lugs at opposite ends thereof, a conveyor for the plates, means on said conveyor for suspending the plates by their lugs and in vertical spaced relation, and means engageable with the plates for removing the latter from said conveyor.

11. In a conveying and discharge mechanism for storage battery plates having lugs at opposite ends thereof, a conveyor for the plates, means on said conveyor for suspending the plates by their lugs and in vertical spaced relation, means engageable with the plates for removing the latter from said conveyor, and means engageable with the plates as the latter are removed from said conveyor for advancing the plates independently of said conveyor.

12. In a conveying and discharge mechanism for storage battery plates having lugs at opposite ends thereof, a conveyor for the plates, means on said conveyor for supporting the plates by their lugs and in vertical spaced relation, means engageable with the plates for removing the latter from said conveyor, means engageable with the plates as the latter are removed from said conveyor for advancing the plates independently of said conveyor, and a slide to which the plates are moved by said last mentioned means.

13. In a conveying and discharge mechanism for storage battery plates having lugs at opposite ends thereof, a conveyor for the plates, means on said conveyor for supporting the plates by their lugs and in vertical spaced relation, means engageable with the plates for removing the latter from said conveyor, and timed operated means engageable with the plates as the latter are removed from said conveyor for advancing the plates independently of said conveyor.

14. In a conveying and discharge mechanism for storage battery plates having lugs at opposite ends thereof, a conveyor for the plates, means on said conveyor for supporting the plates by their lugs and in vertical spaced relation, means engageable with the plates for removing the latter from said conveyor, timed operated means engageable with the plates as the latter are removed from said conveyor for advancing the plates independently of said conveyor, and a slide to which the plates are moved by said last mentioned means.

15. In a conveying and discharge mechanism for storage battery plates having lugs at opposite ends thereof, a conveyor for the plates, means on said conveyor adapted to cooperate with the lugs on the plates for suspending the latter in vertical spaced relation, stationary members extending adjacent said conveyor, and means engageable with the plates for removing the latter from said conveyor onto said stationary members.

16. In a conveying and discharge mechanism for storage battery plates having lugs at opposite ends thereof, a conveyor for the plates, means on said conveyor adapted to cooperate with the lugs on the plates for supporting the latter in vertical spaced relation, stationary members extending adjacent said conveyor, means engageable with the plates for removing the latter from said conveyor onto said stationary members, and means engageable with the plates as the latter are removed from said conveyor for advancing the plates along said stationary members.

17. In a conveying and discharge mechanism for storage battery plates having lugs at opposite ends thereof, a conveyor for the plates, means on said conveyor adapted to cooperate with the lugs on the plates for supporting the latter in vertical spaced relation, means engageable with the plates for removing the latter from said conveyor, and means engageable with the plates as the latter are removed from said conveyor by said last mentioned means for moving said plates independently of said conveyor.

18. In a conveying and discharge mechanism for storage battery plates having lugs at opposite ends thereof, a conveyor for the plates, means on said conveyor adapted to cooperate with the lugs on the plates for supporting the latter in vertical spaced relation, and means engageable with the plates to elevate the same whereby said lugs are disengaged from said cooperating means on said conveyor.

19. In a conveying and discharge mechanism for storage battery plates having lugs at opposite ends thereof, a conveyor for the plates, means on said conveyor adapted to cooperate with the lugs on the plates for supporting the latter in vertical spaced relation, stationary members extending adjacent said conveyor, and means engageable with the plates to elevate the same whereby said lugs are disengaged from said cooperating means on said conveyor and onto said stationary members.

20. In a conveying and discharge mechanism for storage battery plates having lugs at opposite ends thereof, a conveyor for the plates, means on said conveyor adapted to cooperate with the lugs on the plates for supporting the latter in vertical spaced relation, stationary members extending adjacent said conveyor, means engageable with the plates to elevate the same whereby said lugs are disengaged from said cooperating means on said conveyor and onto said stationary members, and means engageable with the plates as they are elevated to thereby move the plates along said stationary members.

21. In a conveying and discharge mechanism for storage battery plates having lugs at opposite ends thereof, a conveyor for the plates, means on said conveyor adapted to cooperate with the lugs on the plates for supporting the latter in vertical spaced relation, means engageable with the plates to elevate the same whereby said lugs are disengaged from said cooperating means on said conveyor and operating in timed relation with respect to said conveyor, and means engageable with said plates as they are elevated to thereby move the plates independently of said conveyor and in timed relation to said last mentioned means.

In testimony whereof, I hereunto affix my signature.

HENRY W. LORMOR.